Patented Jan. 22, 1952

2,583,277

UNITED STATES PATENT OFFICE 2,583,277

EMULSION POLYMERIZATION WITH A REDOX CATALYST COMPRISING A DIAZO THIOETHER

William B. Reynolds, Bartlesville, Okla., assignor to Phillips Petroleum Company, a corporation of Delaware No Drawing. Application April 24, 1947, Serial No. 743,716

15 Claims. (Cl. 260—84.1)

This invention relates to a method for effecting emulsion polymerization reactions of unsaturated organic compounds in the presence of novel catalyst systems of the redox type wherein a diazo thioether is employed as one of the components of the said catalyst system. In one specific aspect it relates to emulsion polymerization processes promoted by redox-type catalysts wherein an oil-soluble diazo thioether is employed to function as a component of the catalyst composition and also as a modifier for the reaction. In the most important embodiments of this invention it relates to polymerization of unsaturated organic compounds to produce polymers of high molecular weights known as synthetic rubber.

The monomeric material polymerized to produce synthetic rubber by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, nitrile, carboxy or the like. Included in this class of monomers are the conjugated butadienes or butadienes-1,3 such as butadiene (butadiene-1,3), 2,3-dimethyl butadiene-1,3, isoprene, piperylene, 3-furyl butadiene-1,3, 3-methoxy butadiene-1,3 and the like; haloprenes, such as chloroprene, (2-chlorobutadiene-1,3) bromoprene, methyl chloroprene (2-chloro-3-methyl-butadiene-1,3), and the like; aryl olefins such as styrene, various alkyl styrenes, p-chloro styrene, p-methoxy styrene, alpha-methyl styrene, vinyl naphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, and the like, methyl isopropenyl ketone, methyl vinyl ketone, methyl vinyl ether, vinylethinyl alkyl carbinols, vinyl acetate, vinyl chloride, vinylidene chloride, vinyl furane, vinyl carbazole, vinyl acetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (butadiene-1,3) and styrene. The invention will, therefore, be more particularly discussed and exemplified with reference to these typical reactants.

In the production of rubber-like elastomers various polymerization recipes have been developed in order to provide polymers of superior synthetic rubber properties. Among the number of recipes employed certain advantages have been achieved through the use of selected combinations of oxidizing and reducing agents which serves as catalysts for the polymerization. These catalysts are frequently referred to as redox systems and comprise an oxidant and an organic reducing agent, for example, a polyhydroxy compound such as a sugar or other easily oxidizable polyhydroxy material either in admixture with or in combination with a heavy metal salt. The oxidant generally employed is a peroxidic-type material such as hydrogen peroxide, benzoyl peroxide, potassium persulfate, and the like. While polymerization reactions are markedly accelerated in the presence of redox catalysts, there are certain disadvantages in the process as it is ordinarily employed. For example, it is generally difficult to control the reaction to produce the type of polymer desired. Another disadvantage in the systems heretofore used is that it is difficult to obtain satisfactory modification.

I have now found a method whereby emulsion polymerization reactions can be carried out in the presence of redox-type catalysts and the limitations of former processes overcome. The method comprises the employment of an oil-soluble diazo thioether instead of the usual peroxidic compound in the catalyst system. When operating in this manner the reactions are readily controlled, more reproducible results are obtained than have heretofore been possible, and the polymers are satisfactorily modified. The results produced when diazo thioethers are employed are wholly unexpected since these compounds are taking the place of oxidizing agents when they are not ordinarily regarded as possessing oxidizing properties.

One object of this invention is to polymerize unsaturated organic compounds.

Another object of this invention is to produce an improved synthetic rubber.

A further object of this invention is to produce a synthetic rubber by polymerization of monomeric material in aqueous emulsion at temperatures lower than ordinarily used.

Still another object of this invention is to increase the reaction rate in polymerizing unsaturated organic compounds in aqueous emulsion.

Another object of this invention is to improve polymerizations using a redox catalyst.

A still further object of this invention is to use a diazo thioether in polymerizing unsaturated organic compounds to polymers of high molecular weights.

Another object of this invention is to provide improved redox catalysts.

Other objects and advantages of this invention will become apparent, to one skilled in the art, from the accompanying disclosure and discussion.

Emulsion polymerization processes carried out according to the method of this invention have numerous advantages in addition to those mentioned above. The process is particularly adaptable to low temperature operations since the reaction rate is sufficiently rapid to warrant its use. It is also applicable when higher temperatures are desired such as those most commonly employed in emulsion polymerization processes. The ability to adjust the rate of polymerization to any desired value by regulating either the temperature or the concentration of the redox components or both represents another advantage of the process. Even though rosin soaps have many advantages when used as the emulsifying agent in polymerization recipes, their use has been restricted because they usually have a retarding action on the polymerization rate. In my process rosin soaps, or mixtures of rosin soaps with fatty acid soaps, give excellent results. The redox systems of the type herein described may be used without mercaptans, if desired, since the diazo thioethers function as modifiers. However, if preferred modifiers such as primary, secondary, or tertiary mercaptans, xanthogen-type compounds and the like may be employed. While in many cases tertiary mercaptans are known to give a slower reaction rate than when the corresponding primary mercaptans are present, in my process they give results that are highly desirable both from the standpoint of conversion rate and modification.

In order to illustrate the process of my invention the following polymerization recipe is presented:

| | Parts by weight |
|---|---|
| Butadiene | 72 |
| Styrene | 28 |
| Rosin soap (adjusted to pH 10) | 3.5 |
| Soap flakes | 1.2 |
| Water | 180 |
| Mercaptan | Variable |
| 2 - (p - methoxybenzene diazo mercapto) - naphthalene | 0.3 |
| Ferrous sulfate ($FeSO_4 \cdot 7H_2O$) | 0.1 |
| Sodium pyrophosphate ($Na_4P_2O_7 \cdot 10H_2O$) | 1.0 |
| Invert sugar or other organic reducing agent | 1.0 |

One procedure which may be employed when charging the ingredients to the reactor is to prepare the soap solution and add the organic reducing agent such as invert sugar, and charge this mixture to the reactor followed by the styrene in which the mercaptan is dissolved. The diazo thioether is then introduced after which the butadiene is added, the temperature of the reactants adjusted to the desired level, and polymerization started by injection of an aqueous solution containing the ferrous sulfate and sodium pyrophosphate. The reactants are agitated at the predetermined temperature for the length of time required to effect the desired conversion after which the reaction is shortstopped and the latex treated with an antioxidant, coagulated, and dried. While the above method represents a specific operating procedure, numerous variations may be employed as desired.

The diazo thioethers employed in this invention are oil-soluble compounds which have the general formula R—N=N—S—R' where R is a member of the group consisting of aromatic and substituted aromatic radicals and R' is a member of the group consisting of aromatic, substituted aromatic, cycloalkyl, substituted cycloalkyl, aliphatic, and substituted aliphatic radicals. Various preferred compounds are more fully described in an application of Reynolds and Cotten, Serial No. 641,866, filed January 17, 1946, now U. S. Patent 2,501,692, granted March 28, 1950, and include those represented by the formula:

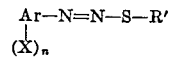

where Ar is an aryl group and X is a substituent selected from the group consisting of alkyl, alkoxy, aryl and aryloxy radicals, $n$ is an integer from one to four; and R' is a member of the group consisting of aromatic, substituted aromatic, cycloalkyl, substituted cycloalkyl, aliphatic, and substituted aliphatic radicals. Specific examples are the following: 2-(p-methoxybenzenediazomercapto) naphthalene, 2-(2,4-dimethylbenzenediazomercapto) naphthalene, 4-(2,4-dimethylbenzenediazomercapto) anisole, and the like. Some of the more important compounds may be conveniently represented by the formula:

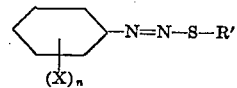

where X is a substituent selected from the group consisting of alkoxy and aryloxy radicals, $n$ is an integer from one to four, and R' is a member of the group consisting of aromatic, substituted aromatic, cycloalkyl, substituted cycloalkyl, aliphatic, and substituted aliphatic radicals.

The amount of diazo thioether used in the present process will generally range from about 0.05 to about 2.0 parts per 100 parts of monomers. The amount is governed by the operating temperature, the quantities of the other catalytic materials present, and the type of product desired.

In addition to the diazo thioether the other catalyst components comprise an easily oxidizable polyhydroxy compound in combination with a heavy metal salt. The polyhydroxy compounds most generally preferred include glucose, levulose, sorbose, d-ribose, and invert sugar but other compounds of a similar nature may be used. The foregoing compounds are from the group consisting of aldoses and ketoses. The heavy metal salts which are applicable are those in which the metal is capable of existing in more than one valence state. Iron salts are most generally preferred, particularly ferrous sulfate, but salts of cobalt, nickel, copper, and the like may also be used.

The amount of the polyhydroxy component in the catalyst composition as well as the heavy metal salt, will depend very largely upon the operating temperature and may, therefore, vary over a rather wide range. The amount of the polyhydroxy compound will generally range from about 0.05 to about 5.0 parts per 100 parts of monomers with about 0.5 to about 3.0 parts being most frequently used. The amount of heavy metal salt will usually range from about 0.001 to about 0.20 part per 100 parts of monomers with about 0.05 to about 0.15 part being most generally preferred. In any case the amounts of these components are adjusted to give the results desired when operating under any given set of conditions.

As hereinbefore mentioned, the diazo thioethers serve as components of the catalyst composition and also as modifiers of chain growth. However, it is frequently advantageous to use supplementary modifiers in addition to the diazo thioethers. The amount of modifier employed will vary depending upon the conditions of the reaction and the results desired as well as upon the compound added. In the case where a mercaptan is used, the amount will generally not exceed 1.0 part per 100 parts of monomers.

When operating according to the method of this invention temperatures may range from about −20 to about 70° C. with temperatures from about 0 to about 20° C. usually preferred. Obviously when polymerization is carried out in aqueous emulsion in the absence of freezing point depressants, temperatures below the freezing point of water cannot be employed. The use of various additive agents, however, makes a process of the type disclosed herein applicable at lower temperatures, and, in fact, this is one of the distinct advantages of the present invention. An example of such a low temperature system is a glycerin-water solution, and the term "aqueous emulsion" should be construed to include the use of an aqueous medium comprising water and a sufficient amount of a water-soluble component, preferably organic, to lower the freezing point below the desired polymerization temperature, whether or not the actual polymerization temperature is above or below 0° C. It is generally preferred that the emulsion be of an "oil in water" type, with the ratio of aqueous medium to monomeric material between about 1.5:1 and about 2.75:1, in parts by weight. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase.

The emulsifying agents which are applicable in this invention are rosin soaps, fatty acid soaps, mixtures of rosin soaps with fatty acid soaps, and any other emulsifying agents which are generally known to produce favorable results in polymerization reactions such as the various sodium alkyl sulfates and sulfonates, sulfated and sulfonated succinic esters, and the like. Rosin soaps and mixtures of rosin soaps with fatty acid soaps are especially desirable and in the latter case there are advantages which are not realized when either rosin soaps or fatty acid soaps are used alone. When the mixture of emulsifying agents is employed, fatty acids need not be added subsequently to the rubber for compounding and rosin soaps are advantageous since they improve the physical properties of the rubber.

Advantages of my invention are illustrated by the following examples. The reactants, and their proportions, and the other specific ingredients of the recipes are presented as being typical and should not be construed to limit the invention unduly.

Example I

A butadiene-styrene copolymer was prepared using the following recipe:

| | Parts by weight |
|---|---|
| Butadiene | 72 |
| Styrene | 28 |
| Rosin soap (pH 10) | 3.5 |
| Soap flakes | 1.2 |
| Water | 180 |
| Tertiary mercaptan blend [1] | 0.4 |
| Ferrous sulfate ($FeSO_4 \cdot 7H_2O$) | 0.1 |
| Sodium pyrophosphate ($Na_4P_2O_7 \cdot 10H_2O$) | 1.0 |
| Invert sugar | 1.0 |
| 2-(p-methoxybenzene diazo mercapto)-naphthalene | 0.3 |

[1] A blend of tertiary $C_{12}$, $C_{14}$, and $C_{16}$ mercaptans in a ratio of 3:1:1 parts by weight.

Polymerization was carried out in the usual manner with agitation, while the temperature was held at about 15° C. The results are tabulated below:

| Time, hours | Conversion, per cent |
|---|---|
| 3.0 | 27.4 |
| 5.5 | 44.1 |
| 8.0 | 55.9 |
| 10.5 | 71.6 |

A parallel run was carried out in which the diazo thioether employed was 2-(p-ethoxybenzene diazo mercapto)-naphthalene and comparable results obtained.

Example II

The recipe of Example I was employed for the preparation of a butadiene-styrene copolymer except that the mercaptan used was 0.4 part primary dodecyl mercaptan and the polyhydroxy compound added was 1.0 part levulose. Polymerization was effected according to conventional technique. The reaction temperature was maintained at about 15° C. A conversion of 70.2 per cent was reached in 8.5 hours. Substitution of 2-(p-ethoxybenzene diazo mercapto)-naphthalene for the methoxy compound used in the first run produced comparable results.

A third run was made in which 0.3 part 2-(p-methylbenzene diazo mercapto)-naphthalene was employed as the diazo thioether. At the end of an 8.5 hour reaction period a conversion of 65.2 per cent was obtained.

Example III

The recipe of Example I was employed except that 0.4 part primary dodecyl mercaptan was used in place of the tertiary mercaptan blend and the invert sugar was replaced by 1.0 part sorbose.

The reaction temperature was maintained at about 15° C. A 65.0 per cent conversion was obtained in 7 hours.

It will be evident to those skilled in the art, various modifications of my invention can be made, or followed in the light of the foregoing disclosure and discussion without departing from the spirit or scope of the disclosure or from the scope of the claims.

I claim:

1. An improved process for producing a synthetic rubber, which comprises copolymerizing in an aqueous emulsion at a polymerization temperature a monomeric mixture comprising a major amount of butadiene-1,3 and a minor amount of styrene in the presence of a redox catalyst comprising essentially an oil-soluble diazo thioether having the formula

R—N=N—S—R' where R is a member of the class consisting of aromatic radicals and R' is a member of the class consisting of aromatic, cycloalkyl, and aliphatic radicals in an amount between 0.05 and 2 parts, an easily oxidizable organic reducing agent selected from the group consisting of aldoses and ketoses in an amount between 0.05 and 5 parts, and a salt of a heavy metal capable of existing in more than one valence state selected from the group consisting of iron, cobalt, nickel and copper in an amount between 0.001 and 0.2 part, all parts by weight per 100 parts of said monomeric material, and recovering from effluents of said polymerization a synthetic rubber so produced.

2. An improved process for producing a synthetic rubber, which comprises polymerizing in an aqueous emulsion at a polymerization temperature an organic monomeric material comprising a conjugated diene in the presence of a redox catalyst comprising essentially an oil-soluble diazo thioether having the formula R—N=N—S—R' where R is a member of the class consisting of aromatic radicals and R' is a member of the class consisting of aromatic, cycloalkyl, and aliphatic radicals in an amount between 0.05 and 2 parts, an easily oxidizable organic reducing agent selected from the group consisting of aldoses and ketoses in an amount between 0.05 and 5 parts, and a salt of a heavy metal capable of existing in more than one valence state selected from the group consisting of iron, cobalt, nickel and copper in an amount between 0.001 and 0.2 part all parts by weight per 100 parts of said monomeric material, and recovering from effluents of said polymerization a synthetic rubber so produced.

3. The process of claim 2 wherein said salt of a heavy metal is an iron salt.

4. The process of claim 1 wherein said diazo thioether is 2-(p-methoxybenzene diazo mercapto)-naphthalene.

5. The process of claim 2 wherein said diazo thioether is 2-(p-methoxybenzene diazo mercapto)-naphthalene.

6. The process of claim 1 wherein said diazo thioether is 2-(p-methylbenzene diazo mercapto)-naphthalene.

7. The process of claim 2 wherein said diazo thioether is 2-(p-methylbenzene diazo mercapto)-naphthalene.

8. In a process for making synthetic rubber by copolymerizing in aqueous emulsion a monomeric material comprising a major amount of butadiene-1,3 and a minor amount of styrene, the improvement which comprises effecting said copolymerization at a temperature between —20 and 20° C. in the presence of a redox composition comprising 0.05 to 2 parts of 2-(p-methoxybenzene diazo mercapto)-naphthalene, 0.5 to 5 parts of a reducing sugar, and 0.001 to 0.2 parts of a ferrous salt, and an alkali metal pyrophosphate, said parts being parts by weight per 100 parts of said monomeric material.

9. In a process for making synthetic rubber by copolymerizing in aqueous emulsion a monomeric material comprising a major amount of butadiene-1,3 and a minor amount of styrene, the improvement which comprises effecting said copolymerization at a temperature between —20 and 20° C. in the presence of a redox composition comprising 0.05 to 2 parts of an alkoxybenzene diazo mercapto-naphthalene, 0.5 to 5 parts of a reducing sugar, and 0.001 to 0.2 part of a ferrous salt, and an alkali metal pyrophosphate, said parts being parts by weight per 100 parts of said monomeric material.

10. In a process for producing a polymeric material of high molecular weight by polymerization in an aqueous emulsion of an organic monomeric material containing a $CH_2$=C< group, in the presence of a redox catalyst composition comprising an oxidant, an organic reducing agent, and a salt of a heavy metal capable of existing in two valence states, the improvement which comprises using a redox catalyst composition comprising an oil-soluble diazo thioether having the formula R—N=N—S—R' where R is a member of the class consisting of aromatic radicals and R' is a member of the class consisting of aromatic, cycloalkyl, and aliphatic radicals as said oxidant, a compound from the group consisting of aldoses and ketoses as said organic reducing agent, and a salt of a metal from the group consisting of iron, cobalt, nickel and copper as said salt of a heavy metal.

11. A polymerization process which comprises polymerizing a monomeric material containing a $CH_2$=C< group while dispersed in an aqueous emulsion in the presence of a polymerization catalyst composition comprising an oil-soluble diazo thioether having the formula

R—N=N—S—R' where R is a member of the class consisting of aromatic radicals and R' is a member of the class consisting of aromatic, cycloalkyl, and aliphatic radicals, a compound from the group consisting of aldoses and ketoses, and a ferrous salt.

12. The process of claim 11 in which an alkali metal pyrophosphate is also present.

13. The process of claim 1 in which an alkali metal pyrophosphate is also present.

14. The process of claim 2 in which an alkali metal pyrophosphate is also present.

15. An improved process for producing a polymer of high molecular weight, which comprises polymerizing in an aqueous emulsion a monomeric material comprising a conjugated diene in the presence of a composition comprising 0.05 to 2 parts of an oil-soluble diazo thioether having the formula R—N=N—S—R' where R is a member of the class consisting of aromatic radicals and R' is a member of the class consisting of aromatic, cycloalkyl, and aliphatic radicals, 0.05 to 5 parts of a reducing sugar, 0.001 to 0.2 part of a ferrous salt, a soap emulsifying agent and an alkali metal pyrophosphate, all parts by weight per 100 parts of said monomeric material, and recovering a resulting polymer so produced.

WILLIAM B. REYNOLDS.

REFERENCES CITED

The following references are of record in the file of this patent:

UNITED STATES PATENTS

| Number | Name | Date |
|---|---|---|
| 2,251,156 | Nygaard | July 29, 1941 |
| 2,376,963 | Garvey | May 29, 1945 |
| 2,380,476 | Stewart | July 31, 1945 |
| 2,501,692 | Reynolds et al. | Mar. 28, 1950 |